US010994880B2

(12) United States Patent
Kim et al.

(10) Patent No.: US 10,994,880 B2
(45) Date of Patent: May 4, 2021

(54) HEAT SHRINKABLE FILM AND PREPARATION METHOD THEREOF

(71) Applicant: SKC CO., LTD., Suwon-si (KR)

(72) Inventors: Chul Kyu Kim, Suwon-si (KR); Yongdeuk Kim, Yeosu-si (KR)

(73) Assignee: SKC CO., LTD., Suwon-si (KR)

( * ) Notice: Subject to any disclaimer, the term of this patent is extended or adjusted under 35 U.S.C. 154(b) by 192 days.

(21) Appl. No.: 16/043,589

(22) Filed: Jul. 24, 2018

(65) Prior Publication Data

US 2019/0352032 A1 Nov. 21, 2019

(30) Foreign Application Priority Data

May 21, 2018 (KR) .................. 10-2018-0057715

(51) Int. Cl.
| | | |
|---|---|---|
| *B65B 53/02* | (2006.01) | |
| *C08J 5/18* | (2006.01) | |
| *B29C 55/00* | (2006.01) | |
| *B29C 55/02* | (2006.01) | |
| *C08G 63/183* | (2006.01) | |
| *B29C 48/08* | (2019.01) | |
| *B29C 48/00* | (2019.01) | |
| *B29K 67/00* | (2006.01) | |
| *B29K 105/02* | (2006.01) | |

(52) U.S. Cl.
CPC .......... *B65B 53/02* (2013.01); *B29C 48/0018* (2019.02); *B29C 48/08* (2019.02); *B29C 55/005* (2013.01); *B29C 55/02* (2013.01); *C08G 63/183* (2013.01); *C08J 5/18* (2013.01); *B29C 2948/92209* (2019.02); *B29C 2948/92476* (2019.02); *B29K 2067/00* (2013.01); *B29K 2105/02* (2013.01); *C08J 2367/02* (2013.01); *Y10T 428/1328* (2015.01)

(58) Field of Classification Search
CPC ..... C08J 5/18; C08J 2367/02; B29C 48/0018; B29C 48/08; B29C 55/005; B29C 55/02; B29C 2948/92209; B29C 2948/92476; B29C 2948/92704; B29C 48/305; B29C 48/91; B29C 48/911; B29C 48/92; B29C 55/04; B29C 55/06; B29C 61/06; B29K 2067/00; B29K 2105/02; B65B 53/02; C08G 63/16; C08G 63/183; C08L 67/02; Y10T 428/1328
See application file for complete search history.

(56) References Cited

U.S. PATENT DOCUMENTS

| | | | |
|---|---|---|---|
| 4,985,538 A | 1/1991 | Fukuda et al. | |
| 6,413,596 B1* | 7/2002 | Okuda .................. | B32B 27/08 428/34.7 |
| 2004/0180229 A1 | 9/2004 | Hayakawa et al. | |
| 2004/0191493 A1 | 9/2004 | Hayakawa et al. | |
| 2007/0104931 A1 | 5/2007 | Ito et al. | |
| 2009/0123697 A1 | 5/2009 | Matsui et al. | |
| 2011/0224369 A1* | 9/2011 | Kim ......................... | C08J 5/18 524/605 |
| 2014/0162042 A1 | 6/2014 | Shih et al. | |
| 2016/0068629 A1 | 3/2016 | Lim et al. | |
| 2016/0090456 A1 | 3/2016 | Ishimaru et al. | |
| 2016/0130414 A1 | 5/2016 | Lim et al. | |
| 2018/0079877 A1 | 3/2018 | Ishimaru et al. | |

FOREIGN PATENT DOCUMENTS

| | | |
|---|---|---|
| CA | 2912355 A1 | 11/2014 |
| CN | 102558517 A | 7/2012 |
| EP | 0 349 960 A2 | 1/1990 |
| EP | 1418042 A1 | 5/2004 |
| EP | 1424188 A1 | 6/2004 |
| EP | 1872935 A1 | 1/2008 |
| EP | 2365025 A1 | 9/2011 |
| EP | 2 631 261 A2 | 8/2013 |
| EP | 3012286 A2 | 4/2016 |
| JP | 2003147097 A | 5/2003 |
| JP | 2009160788 A | 7/2009 |
| JP | 2017140813 A | 8/2017 |
| KR | 10-2009-0007931 A | 1/2009 |
| TW | 201500445 A | 1/2015 |
| WO | 0112697 A1 | 2/2001 |

(Continued)

OTHER PUBLICATIONS

Australian Government Patent Office; Communication dated Jul. 17, 2019 in application No. 2018205116.
Intellectual Property Office of Taiwan, Communication dated May 2, 2019, issued in Application No. 107123854.
European Patent Office; Communication dated Mar. 20, 2019 issued in counterpart application No. 18189120.1.
Communication dated Sep. 28, 2018, from New Zealand Intellectual Property Office in counterpart application No. 744407.

* cited by examiner

*Primary Examiner* — Yan Lan
(74) *Attorney, Agent, or Firm* — Sughrue Mion, PLLC

(57) ABSTRACT

Embodiments relate to a heat shrinkable film, which has a heat shrinkage rate in the direction perpendicular to the main shrinkage direction that is not high even at a high temperature and which is printable thereon. The heat shrinkable film comprises a polyester resin, wherein the heat shrinkage characteristics in the direction perpendicular to the main shrinkage direction satisfy the following Relationships 1 and 2:

$-15 \leq \Delta T_{70-65} \leq 0$         [Relationship 1]

$0 \leq \Delta T_{100-95} \leq 5$         [Relationship 2]

wherein $\Delta T_{X-Y}$ is a value obtained by subtracting a heat shrinkage rate of the heat shrinkable film in the direction perpendicular to the main shrinkage direction after the heat shrinkable film is immersed in a water bath for 10 seconds at Y° C. from a heat shrinkage rate of the heat shrinkable film in the direction perpendicular to the main shrinkage direction after the heat shrinkable film is immersed in a water bath for 10 seconds at X° C.

10 Claims, No Drawings

(56) References Cited

FOREIGN PATENT DOCUMENTS

| | | | |
|---|---|---|---|
| WO | 2009111058 | A1 | 9/2009 |
| WO | 2016067658 | A1 | 5/2016 |
| WO | 2016199809 | A1 | 12/2016 |

HEAT SHRINKABLE FILM AND PREPARATION METHOD THEREOF

TECHNICAL FIELD

Embodiments relate to a heat shrinkable film, which has a low heat shrinkage rate in the direction perpendicular to the main shrinkage direction, the heat shrinkage rate being not high even at a high temperature of 70° C. or higher, and which is printable thereon, and a process for preparing the same.

BACKGROUND ART

A heat shrinkable film refers to a film that tends to shrink to a shape before stretching thereof at a certain temperature or higher once it has been oriented by stretching thereof. A heat shrinkable film is used for shrinkable labels for various types of containers, bundle packaging, or cap seals.

Polyvinyl chloride (PVC) films and oriented polystyrene (OPS) films have been used as heat shrinkable films for a long period of time. However, the use of PVC heat shrinkable films has been regulated due to a problem of environmental pollution since they generate poisonous dioxins when incinerated. OPS heat shrinkable films have a disadvantage in that it is not suitable for shrinkable labels for glass, metal cans, or the like since they have an insufficient heat resistance.

Hence, polyester-based heat shrinkable films having a high shrinkage and a high heat resistance have been developed to address the disadvantages of the PVC and OPS heat shrinkable films.

Such a polyester-based heat shrinkable film can be used for metallic food containers. Since a food container has a direct impact on the human body, the container is subjected to a sterilization process at a high temperature for a predetermined time once the film has been applied to the container. In such event, however, a film applied to the surface of a food container by taking advantage of the mechanism that the film shrinks in the main shrinkage direction may also shrink in the direction perpendicular to the main shrinkage direction. This causes deformation, giving birth to a problem that the film fails to conform to the surface shape of the food container.

Accordingly, there has been a demand for a polyester-based heat shrinkable film, which has a heat shrinkage rate in the direction perpendicular to the main shrinkage direction that is not high even at a high temperature.

DETAILED DESCRIPTION OF INVENTION

Technical Problem

In order to meet the above demand, the embodiments aim to provide a heat shrinkable film, which has a low heat shrinkage rate in the direction perpendicular to the main shrinkage direction, the heat shrinkage rate being not high even at a high temperature of 70° C. or higher, and which is printable thereon, and a process for preparing the same.

Solution to Problem

According to an embodiment, there is provided a heat shrinkable film, which comprises a polyester resin, wherein the heat shrinkage characteristics in the direction perpendicular to the main shrinkage direction satisfy the following Relationships 1 and 2:

$-15 \leq \Delta T_{70-65} \leq 0$      [Relationship 1]

$0 \leq \Delta T_{100-95} \leq 5$      [Relationship 2]

wherein $\Delta T_{X-Y}$ is a value obtained by subtracting a heat shrinkage rate of the heat shrinkable film in the direction perpendicular to the main shrinkage direction after the heat shrinkable film is immersed in a water bath for 10 seconds at Y° C. from a heat shrinkage rate of the heat shrinkable film in the direction perpendicular to the main shrinkage direction after the heat shrinkable film is immersed in a water bath for 10 seconds at X° C.

According to another embodiment, there is provided a process for preparing a heat shrinkable film, which comprises preparing a polyester resin composition; extruding the composition to obtain an unstretched sheet; preheating the unstretched sheet at a preheating temperature (T1) of 100 to 110° C.; stretching the preheated unstretched sheet in one direction to obtain a stretched sheet; thermally treating the stretched sheet at a thermal treatment temperature (T2) of 70 to 98° C.; and cooling the thermally treated and stretched sheet to prepare the heat shrinkable film.

Effects of Invention

The heat shrinkable film according to the embodiment has an excellent shrinkage rate in the main shrinkage direction and a low heat shrinkage rate in the direction perpendicular to the main shrinkage direction, wherein this heat shrinkage rate is not high even at a high temperature of 70° C. or higher. Thus, even if the film applied to the surface of a food container is subjected to a sterilization process, it is not deformed. Therefore, the film can be advantageously used for food containers.

In addition, the heat shrinkable film according to the embodiment is printable thereon. Thus, it is possible to remove the inconvenience of printing on the surface of the container in a conventional way, resulting in an advantage that the container can be readily recycled.

Further, the process for preparing a heat shrinkable film according to the embodiment can provide a heat shrinkable film, which has a heat shrinkage rate in the direction perpendicular to the main shrinkage direction that is not high even at a high temperature and which is printable thereon. Since the film can serve as an economical and environmentally friendly film, it can be used in various ways.

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the description of the embodiments, the term "comprise" means that other elements may be included unless otherwise indicated.

In addition, all numbers expressing quantities of components, reaction conditions, and the like used herein are to be understood as being modified by the term "about" unless otherwise indicated.

<Heat Shrinkable Film>

An embodiment provides a heat shrinkable film, which has a low heat shrinkage rate in the direction perpendicular to the main shrinkage direction, the heat shrinkage rate being not high even at a high temperature, and which is printable thereon.

The heat shrinkable film according to the embodiment comprises a polyester resin.

The polyester resin comprises a dicarboxylic acid component and a diol component.

The dicarboxylic acid component may comprise an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof, and a combination thereof.

Specifically, the dicarboxylic acid component may comprise an aromatic dicarboxylic acid. For example, the dicarboxylic acid component may comprise at least 80% by mole, at least 90% by mole, or at least 95% by mole of terephthalic acid, based on the total number of moles of the dicarboxylic acid component.

Alternatively, the dicarboxylic acid component may be composed of terephthalic acid, dimethyl terephthalic acid, isophthalic acid, naphthalene dicarboxylic acid, orthophthalic acid, or a combination thereof. For example, the dicarboxylic acid component may be composed of terephthalic acid, but it is not limited thereto.

The diol component may comprise ethylene glycol (EG), diethylene glycol (DEG), cyclohexanedimethanol (CHDM), propanediol substituted or unsubstituted with an alkyl group, butanediol substituted or unsubstituted with an alkyl group, pentanediol substituted or unsubstituted with an alkyl group, hexanediol substituted or unsubstituted with an alkyl group, octanediol substituted or unsubstituted with an alkyl group, and a combination thereof.

Specifically, the diol component may comprise ethylene glycol (EG), diethylene glycol (DEG), 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

More specifically, the diol component may comprise at least one selected from the group consisting of ethylene glycol (EG), diethylene glycol (DEG), neopentyl glycol (NPG), and cyclohexanedimethanol (CHDM), it is not limited thereto. Alternatively, the diol component may be composed of at least one selected from the group consisting of ethylene glycol (EG), diethylene glycol (DEG), neopentyl glycol (NPG), and cyclohexanedimethanol (CHDM), it is not limited thereto.

In addition, the diol component may essentially comprise at least one selected from the group consisting of neopentyl glycol (NPG) and cyclohexanedimethanol (CHDM), but it is not limited thereto.

The content of ethylene glycol in the diol component is 50 to 80% by mole based on the total number of moles of the diol component. Specifically, the content of ethylene glycol may be 50 to 77% by mole, 60 to 75% by mole, 65 to 75% by mole, 65 to 71% by mole, or 69 to 71% by mole, based on the total number of moles of the diol component. But it is not limited thereto.

The content of diethylene glycol in the diol component is greater than 0 to 20% by mole based on the total number of moles of the diol component. Specifically, the content of diethylene glycol may be 1 to 15% by mole, 1 to 10% by mole, 5 to 15% by mole, 5 to 10% by mole, or 3 to 7% by mole, based on the total number of moles of the diol component. But it is not limited thereto.

The sum of the contents of neopentyl glycol and cyclohexanedimethanol in the diol component is 10 to 40% by mole based on the total number of moles of the diol component. Specifically, the sum of the contents of neopentyl glycol and cyclohexanedimethanol in the diol component may be 10 to 35% by mole, 10 to 30% by mole, 15 to 35% by mole, 15 to 30% by mole, 20 to 30% by mole, 22 to 30% by mole, 22 to 26% by mole, or 24 to 26% by mole, based on the total number of moles of the diol component. But it is not limited thereto.

Specifically, the content of neopentyl glycol in the diol component is 0 to 30% by mole based on the total number of moles of the diol component. Specifically, the content of neopentyl glycol in the diol component may be 10 to 30% by mole, 20 to 30% by mole, 20 to less than 30% by mole, 20 to 28% by mole, 22 to 30% by mole, 24 to 30% by mole, 22 to 26% by mole, or 24 to 26% by mole, based on the total number of moles of the diol component. But it is not limited thereto.

If the content of neopentyl glycol satisfies the above range, a heat shrinkable film having a heat shrinkage rate in the direction perpendicular to the main shrinkage direction that is not high even at a high temperature can be prepared. In particular, if the content of neopentyl glycol exceeds the above range, the film may excessively expand in the direction perpendicular to the main shrinkage direction, so that wrinkles or deformation may occur when the film is applied to a container. Specifically, if the content of neopentyl glycol exceeds the above range, the amorphous region is unnecessarily larger, whereby the expansion coefficient would be increased due to low shrinkage characteristics in the direction perpendicular to the main shrinkage direction although the shrinkage characteristics in the main shrinkage direction could be improved.

In addition, the content of cyclohexanedimethanol in the diol component is 0 to 30% by mole based on the total number of moles of the diol component. Specifically, the content of cyclohexanedimethanol in the diol component may be 10 to 30% by mole, 20 to 30% by mole, or 22 to 30% by mole, based on the total number of moles of the diol component. But it is not limited thereto.

According to an embodiment, the diol component may comprise only one of neopentyl glycol and cyclohexanedimethanol. That is, if the diol component comprises neopentyl glycol, it does not comprise cyclohexanedimethanol. If the diol component comprises cyclohexanedimethanol, it does not comprise neopentyl glycol.

If the diol component comprises neopentyl glycol without cyclohexanedimethanol among the above alternatives, it is more effective in materializing the object of the embodiment.

The diol component may further comprise a monohydric alcohol component in addition to the dihydric alcohol components as described above. For example, it may further comprise isopropyl alcohol (IPA) as the monohydric alcohol component.

In such event, the content of the monohydric alcohol component may be 15 to 30% by mole, 18 to 25% by mole, or 20 to 25% by mole, based on the total number of moles of the diol component and the monohydric alcohol component, but it is not limited thereto.

The dicarboxylic acid component and the diol component are subjected to a transesterification reaction and then polymerization to thereby form a copolymerized polyester resin.

The heat shrinkable film according to an embodiment has heat shrinkage characteristics in the direction perpendicular to the main shrinkage direction, which satisfy the following Relationships 1 and 2:

$$-15 \leq \Delta T_{70-65} \leq 0 \quad \text{[Relationship 1]}$$

$$0 \leq \Delta T_{100-95} \leq 5 \quad \text{[Relationship 2]}$$

wherein $\Delta T_{X-Y}$ is a value obtained by subtracting a heat shrinkage rate of the heat shrinkable film in the direction perpendicular to the main shrinkage direction after the heat shrinkable film is immersed in a water bath for 10 seconds at Y° C. from a heat shrinkage rate of the heat shrinkable film in the direction perpendicular to the main shrinkage direction after the heat shrinkable film is immersed in a water bath for 10 seconds at X° C.

That is, $\Delta T_{70-65}$ refers to a value obtained by subtracting a heat shrinkage rate of the heat shrinkable film in the direction perpendicular to the main shrinkage direction after the heat shrinkable film is immersed in a water bath for 10 seconds at 65° C. from a heat shrinkage rate of the heat shrinkable film in the direction perpendicular to the main shrinkage direction after the heat shrinkable film is immersed in a water bath for 10 seconds at 70° C.

In addition, $\Delta T_{100-95}$ refers to a value obtained by subtracting a heat shrinkage rate of the heat shrinkable film in the direction perpendicular to the main shrinkage direction after the heat shrinkable film is immersed in a water bath for 10 seconds at 95° C. from a heat shrinkage rate of the heat shrinkable film in the direction perpendicular to the main shrinkage direction after the heat shrinkable film is immersed in a water bath for 10 seconds at 100° C.

The heat shrinkage rate is calculated by the equation of (a−b)/a×100 in the unit of percent once the length (a) of a sample before being immersed in the hot water tank and the length (b) of the sample after being immersed in the hot water tank for 10 seconds have been measured.

That is, if b is smaller than a, it means that the sample shrinks when immersed in the hot water tank, and the heat shrinkage rate would have a positive value. On the other hand, if b is larger than a, it means that the sample expands when immersed in the hot water tank, and the heat shrinkage rate would have a negative value. If a heat shrinkage rate is negative, the (heat) expansion rate has the same absolute value in the opposite sign. For example, when a heat shrinkage rate is −10%, the (heat) expansion rate is 10%.

In an embodiment, the maximum expansion rate in the direction perpendicular to the main shrinking direction of the heat shrinkable film is 3 to 15%. Specifically, the maximum expansion rate in the direction perpendicular to the main shrinkage direction of the heat shrinkable film may be 3 to 12%, 5 to 12%, 5 to 11%, 5 to 10%, 5 to 8%, or 7 to 8%, but it is not limited thereto.

If the maximum expansion rate in the direction perpendicular to the main shrinkage direction of the heat shrinkable film is within the above range, even if the film applied to the surface of a food container is subjected to a sterilization process for a predetermined period of time at a high temperature, the film can be adhered to the surface of the container in a desired shape without significant deformation. Further, as a slight shrinkage occurs in the main shrinkage direction during the sterilization process at a high temperature, an insufficient shrinkage, if any, in the previous shrinkage step could be compensated.

The maximum expansion rate is calculated from the minimum value of the heat shrinkage rates measured in the direction perpendicular to the main shrinkage direction after the film has been immersed in a water bath for 10 seconds at a specific temperature (for example, at a 5° C. interval between 50 and 100° C.).

According to an embodiment, when the heat shrinkage rate in the direction perpendicular to the main shrinkage direction of the heat shrinkable film is measured at an interval of 5° C. between 50° C. and 100° C., the minimum value of the heat shrinkage rates is present between 70° C. and 90° C. In other words, the heat shrinkable film has a maximum expansion rate that is present between 70° C. and 90° C.

Specifically, the heat shrinkable film has a maximum expansion rate between 75° C. and 90° C. More specifically, the heat shrinkable film may have a maximum expansion rate between 75° C. and 85° C.

With respect to the heat shrinkage characteristics in the direction perpendicular to the main shrinkage direction, the heat shrinkable film according to another embodiment satisfies that $T_{75}$ is −12 to 0%, that $T_{80}$ is −15 to 0%, that $T_{85}$ is −10 to 0%, and that $T_{90}$ is −10 to 5%.

In the above, $T_Z$ refers to a heat shrinkage rate in the direction perpendicular to the main shrinkage direction after the heat shrinkable film has been immersed in a water bath for 10 seconds at Z° C.

Specifically, $T_{75}$ may be −12 to −3%, −12 to −5%, −10 to −5%, −9 to −5%, −10 to −6%, or −8 to −6%.

In addition, $T_{80}$ may be −12 to −0.5%, −12 to −2%, −12 to −2.5% −12 to −3%, −10 to −2.5%, −8 to −2.5%, −7 to −2.5%, or −7 to −3%.

In addition, $T_{85}$ may be −9 to −0.2%, −7 to −0.2%, −5 to −0.5%, −5 to −0.7%, −4.5 to −0.7%, or −4.3 to −0.7%.

In addition, $T_{90}$ may be −10 to 2%, −7 to 2%, −7 to 1%, −3 to 1.5%, −2 to 1%, or −2 to 0.5%.

With respect to the heat shrinkage characteristics in the direction perpendicular to the main shrinkage direction, the heat shrinkable film according to another embodiment satisfies that all of $T_{75}$, $T_{80}$, and $T_{85}$ are less than 0%.

If the heat shrinkable film satisfies that $T_{75}$, $T_{80}$, and $T_{85}$ are within the above range with respect to the heat shrinkage characteristics in the direction perpendicular to the main shrinkage direction, the shrinkage characteristics of the film are optimized for the shape of a bottle when it is used as a general heat shrinkable film. Further, the shrinkage in the direction perpendicular to the main shrinkage direction is less likely to occur in the sterilization process under the high-temperature and high-pressure conditions.

According to an embodiment, the heat of crystallization (ΔHc) of the heat shrinkable film as measured by differential scanning calorimetry (DSC) is 0 to 30 J/g. Specifically, the heat of crystallization (ΔHc) of the heat shrinkable film as measured by differential scanning calorimetry (DSC) may be 0 to 27 J/g, 0 to 20 J/g, 0 to 15 J/g, 0 to 10 J/g, 0 to 5 J/g, 0 to 2 J/g, or 0 to 1 J/g, but it is not limited thereto.

The heat of crystallization (ΔHc) refers to the amount of heat generated during crystallization as measured by differential scanning calorimetry (DSC). Specifically, the larger the heat of crystallization, the higher the crystallinity of the film. If the heat of crystallization is within the above range, it indicates that the film has a structure close to being amorphous. For example, if the heat of crystallization (ΔHc) is 0 J/g, it means that the film is composed of an amorphous structure having no crystallinity.

The heat shrinkable film according to another embodiment has heat shrinkage characteristics in the direction perpendicular to the main shrinkage direction that satisfy the following Relationships 1a and 2a:

$$-10 \leq \Delta T_{70-65} \leq 0 \quad \text{[Relationship 1a]}$$

$$0 \leq \Delta T_{100-95} \leq 2 \quad \text{[Relationship 2a]}$$

Specifically, the heat shrinkable film has heat shrinkage characteristics in the direction perpendicular to the main shrinkage direction that satisfy the following Relationships 1b and 2b:

$$-8 \leq \Delta T_{70-65} \leq -1 \quad \text{[Relationship 1b]}$$

$$0.2 \leq \Delta T_{100-95} \leq 1 \quad \text{[Relationship 2b]}$$

More specifically, the heat shrinkable film has heat shrinkage characteristics in the direction perpendicular to the main shrinkage direction that satisfy the following Relationships 1c and 2c:

$$-6 \leq \Delta T_{70-65} \leq -1.2 \quad \text{[Relationship 1c]}$$

$$0.2 \leq \Delta T_{100-95} \leq 0.7 \quad \text{[Relationship 2b]}$$

If the heat shrinkage characteristics of the heat shrinkable film in the direction perpendicular to the main shrinkage direction satisfy the above-mentioned conditions, the film may shrink in conformation to the shape and size of a container. Thus, it can properly adhere to the surface shape of the container.

Various characteristics such as the constituent components of the heat shrinkable film and the physical properties of the heat shrinkable film may be combined.

<Process for Preparing a Heat Shrinkable Film>

The process for preparing a heat shrinkable film according to an embodiment comprises preparing a polyester resin composition; extruding the composition to obtain an unstretched sheet; preheating the unstretched sheet at a preheating temperature (T1) of 100 to 110° C.; stretching the preheated unstretched sheet in one direction to obtain a stretched sheet; thermally treating the stretched sheet at a thermal treatment temperature (T2) of 70 to 98° C.; and cooling the thermally treated and stretched sheet to prepare the heat shrinkable film.

The process for preparing a heat shrinkable film, which has a heat shrinkage rate in the direction perpendicular to the main shrinkage direction that is not high even at a high temperature and which is printable thereon, is described in detail, as follows.

First, a polyester resin composition is prepared.

The polyester resin contained in the polyester resin composition comprises a dicarboxylic acid component and a diol component. The dicarboxylic acid component and the diol component are mixed and subjected to a transesterification reaction.

In such event, at least one catalyst selected from manganese acetate, calcium, and zinc may be used as a catalyst for the transesterification reaction. The amount of the catalyst used is preferably 0.02 to 0.2 part by weight based on 100 parts by weight of the dicarboxylic acid compound.

Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a copolymerized polyester resin composition.

The details on the polyester resin, the dicarboxylic acid component, the diol component, and the like are referred to those described in the above section of <Heat Shrinkable Film>.

Next, the composition is extruded to obtain an unstretched sheet.

The composition is extruded through a T-die at an extrusion temperature of 260 to 300° C. or 270 to 290° C. and then cooled.

The unstretched sheet obtained by extruding the composition and cooling it is fed to, and passed through, a roll at a speed of 50 m/min to 100 m/min or 50 m/min to 80 m/min.

In such event, the desired thickness of the film can be adjusted by controlling the feed speed of the unstretched sheet. For example, the thickness of the film may be adjusted to 35 to 75 μm or 40 to 50 μm at this step.

Then, the unstretched sheet is preheated at a preheating temperature (T1) of 100 to 110° C.

Specifically, the preheating temperature (T1) may be 103 to 107° C. or 104 to 106° C.

In addition, the preheating time at the preheating temperature (T1) may be 0.01 to 1 minute. Specifically, the preheating time may be 0.05 to 0.5 minutes or 0.08 to 0.2 minutes, but it is not limited thereto.

Next, the preheated unstretched sheet is stretched in one direction to obtain a stretched sheet.

The stretching is carried out at a temperature lower than the preheating temperature (T1) by 20° C. or more. Specifically, the stretching temperature may be 60 to 90° C., 70 to 90° C., or 80 to 90° C., but it is not limited thereto.

The stretching is carried out at a stretching ratio of 3 to 5 times in one direction at the stretching temperature. Specifically, the stretching may be carried out at a stretching ratio of 3 to 4.5 times, 3.5 to 4.5 times, or 4 to 4.5 times in one direction, but it is not limited thereto.

Then, the stretched sheet is thermally treated at a thermal treatment temperature (T2) of 70 to 98° C.

Specifically, the thermal treatment temperature (T2) may be 70 to 95° C., 70 to 90° C., 70 to 85° C., or 70 to 80° C., but it is not limited thereto.

According to an embodiment, the preheating temperature (T1)—the thermal treatment temperature (T2) is preferably 10 to 40° C. For example, T1-T2 may be 13 to 35° C., 11 to 34° C., 15 to 34° C., or 20 to 34° C.

If T1-T2 satisfies the above range, the shrinkage rate in the main shrinkage direction and the heat shrinkage rate in the direction perpendicular to the main shrinkage direction can be controlled.

In addition, the thermal treatment time at the thermal treatment temperature (T2) may be 0.01 to 1 minute. Specifically, the thermal treatment time may be 0.05 to 0.5 minute or 0.08 to 0.2 minute, but it is not limited thereto.

Even if a film is produced using the same dicarboxylic acid and diol components in the same amounts, the physical properties of the film thus produced may be significantly different depending on the specific process steps.

A heat shrinkable film that has a heat shrinkage rate in the direction perpendicular to the main shrinkage direction at a desired level and is printable thereon can be prepared through the process steps according to the embodiment.

Next, the thermally treated and stretched sheet is cooled to prepare the heat shrinkable film.

The heat shrinkable film is continuously produced through the above-described process.

Then, the process may further comprise the step of winding the cooled heat shrinkable film into a roll shape.

In addition, the process may further comprise the step of printing on the heat shrinkable film. At this time, the printing step may be performed before or after the step of winding the heat shrinkable film.

Since the heat shrinkable film has an amorphous characteristic, it is possible to directly print on the film itself.

In a conventional way, a heat shrinkable film is normally applied on the surface of a container once the surface of the container has been printed. This way inconveniently involves the removal of the film and the printing as well in order to recycle the container.

In contrast, the heat shrinkable film prepared according to the embodiment is printable thereon. Thus, it has an advantage that the container can be readily recycled.

The details on the heat shrinkable film prepared according to the process for preparing a heat shrinkable film are referred to those described in the above section of <Heat Shrinkable Film>.

For example, the heat shrinkable film prepared by the process for preparing a heat shrinkable film comprises a polyester resin and has heat shrinkage characteristics in the direction perpendicular to the main shrinkage direction that satisfy the above Relationships 1 and 2.

In addition, various characteristics such as the constituent components of the heat shrinkable film and the physical properties of the heat shrinkable film may be combined.

EMBODIMENTS FOR CARRYING OUT THE INVENTION

Example

Hereinafter, the present invention will be described in more detail with reference to the following examples. However, these examples are set forth to illustrate the present invention, and the scope of the present invention is not limited thereto.

Examples 1 to 7 and Comparative Examples 1 and 2

The dicarboxylic acid component and the alcohol component in the kinds and contents shown in Table 1 below were charged to an autoclave equipped with a stirrer and a distillation tower. In addition, 0.007 parts by weight of manganese acetate as a transesterification catalyst was added per 100 parts by weight of the dicarboxylic acid component, followed by heating the mixture to 220° C. and the removal of methanol produced as a byproduct to carry out the reaction.

Upon completion of the transesterification reaction, 0.07 part by weight of silica having an average particle diameter of 0.28 μm was added per 100 parts by weight of the dicarboxylic acid component, and 0.4 part by weight of trimethyl phosphate as a stabilizer was added. After 5 minutes, 0.035 part by weight of antimony trioxide and 0.005 part by weight of tetrabutylene titanate were added as a polymerization catalyst, followed by stirring for 10 minutes.

Subsequently, the reaction mixture was transferred to a second reactor equipped with a vacuum apparatus. The pressure was gradually reduced while the temperature was raised to 285° C., and the polymerization was carried out for about 210 minutes to thereby prepare a copolymerized polyester resin.

A composition containing the polyester resin thus obtained was extruded through a T-die at 270° C. and then cooled to thereby obtain an unstretched sheet. The unstretched sheet was fed to, and passed through, a roll at a speed of 55 m/min to thereby adjust the thickness of the sheet. Then, the unstretched sheet was preheated at a preheating temperature (T1) of 100 to 110° C. for 0.1 minute while it was transferred at a speed of 55 m/min.

Next, the unstretched sheet was stretched at a stretching ratio of 4 to 4.5 times in one direction at a stretching temperature lower than T1 by 20° C. or more to thereby prepare a stretched sheet.

Then, the stretched sheet was subjected to thermal treatment at a thermal treatment temperature (T2) at which T1-T2 satisfied the conditions shown in Table 2 below for 0.1 minute to thereby prepare a stretched sheet having a thickness of 40 μm.

Evaluation Example

Evaluation Example 1: Measurement of Heat Shrinkage Rates

Each film thus produced was cut into a length of 300 mm (a, length of the sample before being immersed in a hot water bath) and a width of 15 mm. The cut sample was immersed in a water bath heated to a specific temperature for 10 seconds, and the length of the sample was then measured. The heat shrinkage rate was calculated by the equation of (a−b)/a×100. The results are shown in Table 2 below.

Evaluation Example 2: Heat of Crystallization (ΔHc) Measured by DSC

A sample of each film thus produced was mounted on an equipment capable of measuring Tg, Tm, and Tc. The endotherm and exotherm of the sample were measured while the temperature was raised at a rate of 1° C./min to obtain a heat flow graph with respect to the temperature. The heat of crystallization (ΔHc) was measured from this graph. The results are shown in Table 2 below

TABLE 1

| | Dicarboxylic acid | Alcohol | | | | |
|---|---|---|---|---|---|---|
| | TPA | DEG | EG | NPG | CHDM | IPA |
| Ex. 1 | 100 | 5 | 71 | 24 | — | — |
| Ex. 2 | 100 | 5 | 71 | 24 | — | — |
| Ex. 3 | 100 | 5 | 69 | 26 | — | — |
| Ex. 4 | 100 | 5 | 65 | 30 | — | — |
| Ex. 5 | 100 | 5 | 65 | 30 | — | — |
| Ex. 6 | 100 | 5 | 65 | — | 30 | — |
| Ex. 7 | 100 | 10 | 68 | — | 22 | — |
| Ex. 8 | 100 | 1 | 63 | 14 | — | 22 |
| Ex. 9 | 100 | 5 | 71 | 24 | — | — |
| C. Ex. 1 | 100 | 5 | 78 | 17 | — | — |
| C. Ex. 2 | 100 | 5 | 78 | 17 | — | — |

TABLE 2

| | T1-T2 (° C.) | Heat flow on DSC (J/g) | Heat shrinkage rate in the direction perpendicular to the main shrinkage direction (%) | | | | Max. expansion rate (%) | $\Delta T_{70-65}$ | $\Delta T_{100-95}$ |
|---|---|---|---|---|---|---|---|---|---|
| | | | 75° C. | 80° C. | 85° C. | 90° C. | | | |
| Ex. 1 | 27 | 0 | −7 | −3 | −1 | 0.3 | 7 | −4.7 | 0.4 |
| Ex. 2 | 20 | 0 | −6 | −7 | −4.3 | −2 | 7 | −1.4 | 0.7 |
| Ex. 3 | 34 | 0 | −8 | −4 | −0.7 | 1.3 | 8 | −5.3 | 0.3 |
| Ex. 4 | 23 | 0 | −11.7 | −7.7 | −1.3 | −0.7 | 11.7 | −4.4 | 1 |

TABLE 2-continued

|  | T1-T2 (°C.) | Heat flow on DSC (J/g) | Heat shrinkage rate in the direction perpendicular to the main shrinkage direction (%) | | | | Max. expansion rate (%) | $\Delta T_{70-65}$ | $\Delta T_{100-95}$ |
|---|---|---|---|---|---|---|---|---|---|
|  |  |  | 75° C. | 80° C. | 85° C. | 90° C. |  |  |  |
| Ex. 5 | 13 | 0 | −9.7 | −12 | −9 | −6 | 12 | −2.3 | 1 |
| Ex. 6 | 28 | 0 | −5 | −3 | −1 | 2 | 5 | −1 | 0 |
| Ex. 7 | 21 | 0 | 0 | −1 | −5 | −3 | 5 | 0 | 1 |
| Ex. 8 | 35 | 27 | −3 | −2 | −1 | −0.3 | 3 | −1.4 | 0.8 |
| Ex. 9 | 11 | 0 | −1.7 | −4 | −5 | −6.3 | 6.3 | −1.7 | 1 |
| C. Ex. 1 | 35 | 46.8 | −2 | −1.7 | 0.7 | 2.3 | 2 | 0.4 | 0 |
| C. Ex. 2 | 25 | 46.8 | −1 | −2 | −0.7 | 1.7 | 2 | 0 | −0.3 |

T1: preheating temperature
T2: thermal treatment temperature

Heat shrinkage rate in the direction perpendicular to the main shrinkage direction: heat shrinkage rate in the direction perpendicular to the main shrinkage direction after the sample was immersed in a water bath for 10 seconds at a specific temperature As confirmed from Tables 1 and 2, the specific dicarboxylic acid and diol components were employed in the specific amounts, and the preheating temperature and the thermal treatment temperature were adjusted to produce films in Examples 1 to 9. As a result, the heat of crystallization on DSC was 30 J/g or less, and the maximum expansion rate in the direction perpendicular to the main shrinkage direction was 3 to 15%, unlike Comparative Examples 1 and 2. Since the films had a heat expansion rate in the direction perpendicular to the main shrinkage direction that is not high at a high temperature, they are suitable as a shrinkable label for containers. The films are also economical since they are printable thereon.

The invention claimed is:

1. A heat shrinkable film, which comprises a polyester resin,
   wherein a maximum expansion rate in direction perpendicular to main shrinking direction of the heat shrinkable film is 5 to 12%;
   wherein the polyester resin comprises a dicarboxylic acid component and a diol component, and the diol component comprises diethylene glycol and neopentyl glycol;
   wherein content of diethylene glycol is 5 to 15% by mole based on the total number of moles of the diol component, and content of neopentyl glycol is 22 to 30% by mole based on the total number of moles of the diol component; and
   wherein heat shrinkage characteristics of the heat shrinkable film in the direction perpendicular to the main shrinkage direction satisfy the following Relationships 1b and 2b:
   Relationship 1b −8% ≤ $\Delta T_{X-Y}$ ≤ −1%, wherein X is 70 and Y is 65,
   Relationship 2b 0.2% ≤ $\Delta T_{X-Y}$ ≤ 1%, wherein X is 100 and Y is 95,
   wherein $\Delta T_{X-Y}$ is a value obtained by subtracting a heat shrinkage rate of the heat shrinkable film in the direction perpendicular to the main shrinkage direction after the heat shrinkable film is immersed in a water bath for 10 seconds at Y° C. from a heat shrinkage rate of the heat shrinkable film in the direction perpendicular to the main shrinkage direction after the heat shrinkable film is immersed in a water bath for 10 seconds at X° C.

2. The heat shrinkable film of claim 1, wherein the maximum expansion rate of the heat shrinkable film is present between 70° C. and 90° C. when the heat shrinkage of the heat shrinkable film in the direction perpendicular to the main shrinkage direction is measured at an interval of 5° C. between 50° C. and 100° C.

3. The heat shrinkable film of claim 1, whose heat of crystallization (ΔHc) as measured by differential scanning calorimetry (DSC) is 0 to 30 J/g.

4. The heat shrinkable film of claim 1, which satisfies that $T_{75}$ is −12 to 0%, that $T_{80}$ is −15 to 0%, that $T_{85}$ is −10 to 0%, wherein $T_{75}$, $T_{80}$, and $T_{85}$ each refer to a heat shrinkage rate in the direction perpendicular to the main shrinkage direction after the heat shrinkable film is immersed in a water bath for 10 seconds at 75° C., 80° C., and 85° C., respectively.

5. A process for preparing a heat shrinkable film according to claim 1, which comprises:
   (a) preparing a polyester resin composition, wherein the polyester resin comprises a dicarboxylic acid component and a diol component, and the diol component comprises diethylene glycol and neopentyl glycol, and wherein the content of diethylene glycol is 5 to 15% by mole based on the total number of moles of the diol component, and the content of neopentyl glycol is 22 to 30% by mole based on the total number of moles of the diol component;
   (b) extruding the composition to obtain an unstretched sheet;
   (c) preheating the unstretched sheet at a preheating temperature (T1) of 100 to 110° C.;
   (d) stretching the preheated unstretched sheet in one direction to obtain a stretched sheet;
   (e) thermally treating the stretched sheet at a thermal treatment temperature (T2) of 70 to 98° C.; and
   (f) cooling the thermally treated and stretched sheet to prepare the heat shrinkable film,
   wherein a maximum expansion rate in direction perpendicular to main shrinking direction of the heat shrinkable film is 5 to 12%;
   wherein heat shrinkage characteristics of the heat shrinkable film in the direction perpendicular to the main shrinkage direction satisfy the following Relationships 1b and 2b:
   Relationship 1b −8 ≤ $\Delta T_{X-Y}$ ≤ −1%, wherein X is 70 and Y is 65,
   Relationship 2b 0.2 ≤ $\Delta T_{X-Y}$ ≤ 1%, wherein X is 100 and Y is 95
   wherein $\Delta T_{X-Y}$ is a value obtained by subtracting a heat shrinkage rate of the heat shrinkable film in the direction perpendicular to the main shrinkage direction after the heat shrinkable film is immersed in a water bath for 10 seconds at Y° C. from a heat shrinkage rate of the heat shrinkable film in the direction perpendicular to the main shrinkage direction after the heat shrinkable film is immersed in a water bath for 10 seconds at X° C.

6. The process for preparing a heat shrinkable film of claim 5, wherein the extrusion (b) is carried out at 260 to 300° C.

7. The process for preparing a heat shrinkable film of claim 5, wherein T1-T2 is 10 to 40° C.

8. The process for preparing a heat shrinkable film of claim 5, wherein the preheating (c) is carried out for 0.01 to 1 minute.

9. The process for preparing a heat shrinkable film of claim 5, wherein the stretching (d) is carried out at a stretching ratio of 3 to 5 times in one direction.

10. The process for preparing a heat shrinkable film of claim 5, which further comprises printing on the heat shrinkable film.

\* \* \* \* \*